US005914945A

United States Patent [19]

Abu-Amara et al.

[11] Patent Number: 5,914,945

[45] Date of Patent: Jun. 22, 1999

[54] METHOD AND SYSTEM FOR BANDWIDTH ALLOCATION FOR MULTIMEDIA SERVICES UNDER AGGREGATE TRAFFIC CONDITIONS

[75] Inventors: Hosame Hassan Abu-Amara, Richardson; Venkat Kotamarti, Dallas, both of Tex.

[73] Assignee: Northern Telecom Limited, Montreal, Canada

[21] Appl. No.: 08/775,157

[22] Filed: Dec. 31, 1996

[51] Int. Cl.[6] .................................. H04J 3/26; H04L 5/22

[52] U.S. Cl. .......................... 370/329; 370/341; 370/437; 370/468

[58] Field of Search .................................... 370/229, 230, 370/232, 235, 238, 328, 329, 341, 412, 437, 465, 468; 375/240; 455/422, 454, 464; 379/243

[56] References Cited

U.S. PATENT DOCUMENTS

| | | | |
|---|---|---|---|
| 4,919,650 | 4/1990 | Sriram | 370/235 |
| 5,274,644 | 12/1993 | Berger et al. | 370/95.1 |
| 5,592,470 | 1/1997 | Rudrapatna et al. | 370/468 |
| 5,625,877 | 4/1997 | Dunn et al. | 370/468 |
| 5,748,629 | 5/1998 | Caldara et al. | 370/389 |
| 5,751,712 | 5/1998 | Farwell et al. | 370/468 |
| 5,796,724 | 8/1998 | Rajamani et al. | 370/468 |

OTHER PUBLICATIONS

S. Low et al., “A New Approach to Service Provisioning in ATM Networks,” IEEE 1993, pp. 547–553.

F.P. Kelly, “Tariffs and Effective Bandwidths in Multimedia Networks,” 1994, pp. 401–410.

H. Ji et al., “GoS–Based Pricing and Resource Allocation for Multimedia Broadband Networks,” IEEE 1996, pp. 1020–1027.

H. Ji et al., “Statistical Resource Allocation and Pricing in Broadband Communications Networks,” IEEE 1996, pp. 247–258.

*Primary Examiner*—Chi H. Pham
*Assistant Examiner*—Ricky Ngo
*Attorney, Agent, or Firm*—John D. Crane; Andrew J. Dillon

[57] ABSTRACT

A method and system are provided for calculating the most efficient bandwidth allocation for multimedia traffic under aggregate traffic conditions within a shared transmission medium, such as an ATM network, in a manner which maximizes long term revenue. First, the total number of service groups within the network is specified by a network operator or a network designer. Each service group may contain multiple different types of communication traffic. Thereafter, for each service group, the number of users who utilize the services within that service group is determined. The average idle sojourn time and average burst sojourn time for each system state are then determined for each service group. Next, a specification of the peak rate, the probability that a user will access the service during a specified busy period, and an average session duration are determined. A specification of the price of each service per unit time is then provided by the network operator as well as the total available bandwidth in bits per second. Thereafter, these parameters are utilized to partition the bandwidth within the network among the various service groups so as to maximize long-run average system revenue.

6 Claims, 3 Drawing Sheets

METHOD AND SYSTEM FOR BANDWIDTH ALLOCATION FOR MULTIMEDIA SERVICES UNDER AGGREGATE TRAFFIC CONDITIONS

CROSS-REFERENCE TO RELATED APPLICATION

This application is related to co-pending U.S. patent application Ser. No. 08/775,158, (Attorney Docket No. 0267-AD-RR1 1154) and U.S. patent application Ser. No. 08/775,161, (Attorney Docket No. 0267AD-RR1156), both filed of even date herewith by the inventors herein named. The aforementioned co-pending applications are hereby incorporated herein by reference thereto.

BACKGROUND OF THE INVENTION

1. Technical Field

The present invention relates to improvements in network design and in particular to improved methods and systems for bandwidth allocation for multimedia services under aggregate traffic conditions. Still more particularly, the present invention relates to a method and system for bandwidth allocation for multimedia services within a shared transmission medium in a manner which maximizes long-run average revenue.

2. Description of the Related Art

No where has the explosion of modern technology been more evident than in the field of communication. The number and type of communication services has been rapidly expanding, including so-called “multimedia” services such as video teleconferencing, video/movies on demand and the like.

The intermixing of these multimedia services with traditional data and voice communications within a shared transmission medium has presented various design problems. For example, consider a system which receives packetized telecommunication traffic from n multimedia services which are queued either in one central queue or in multiple distributed queues wherein one queue is associated with each service. Thus, if more than n subscribers to the services are utilizing the network at any given time, the received packets which are not processed by the system are queued. During heavy use periods, as the number of users increase, and these queues become quite large, certain packets may be discarded based upon a priority scheme and delay will increase and quality of service will suffer.

In the past, attempts at statistically modeling aggregate traffic which originates from homogenous services with similar traffic types and similar characteristics have been proposed. For example, the Poisson Process is widely utilized to model aggregate traffic from voice sources. Similarly, the discreet Auto Regressive Process has been utilized to model aggregate traffic from video-teleconferencing sources. A Markov Modulated Poisson Process is often utilized to model aggregate traffic from data sources. These techniques typically require complex mathematical expressions which are not explicit and which require time-consuming numerical methods to solve.

Those skilled in the art will appreciate that an accurate model of aggregate traffic within a network may be utilized to partition system capacity among multiple services. In the prior art, networks typically follow either the so-called “complete sharing” approach or the “complete partitioning” approach. In the complete sharing approach, each of the services within the system share system bandwidth on a first-come first-served basis. This approach is simple and utilizes system bandwidth efficiently; however, it may not maximize system revenue in a manner which is desired, in view of the extensive expense undertaken in the establishment of such networks. In the complete partitioning approach, each system has its own bandwidth and no two services share the same bandwidth. This approach can be utilized to maximize system revenue, for example, by assigning more bandwidth to expensive services than is assigned to lower priced services. However, the complete partitioning approach is not very flexible in that new services which are added to the network require a recalculation of the assigned bandwidth. Additionally, complete partitioning will sometimes waste system bandwidth because services can not share available bandwidth within an another partition within the system bandwidth.

It should thus be apparent to those skilled in the art that a method and system for efficient allocation of bandwidth for multimedia services under aggregate traffic conditions would result in a network in which the operators’ return for operation of the network could be enhanced over the long term.

SUMMARY OF THE INVENTION

It is therefore one object of the present invention to provide an improved network design.

It is another object of the present invention to provide improved methods and systems for bandwidth allocation for multimedia services under aggregate traffic conditions.

It is yet another object of the present invention to provide an improved method and system for bandwidth allocation for multimedia services within a shared transmission medium in a manner which maximizes long-run average revenue.

The foregoing objects are achieved as is now described. A method and system are provided for calculating the most efficient bandwidth allocation for multimedia traffic under aggregate traffic conditions within a shared transmission medium, such as an ATM network, in a manner which maximizes long term revenue. First, the total number of service groups within the network is specified by a network operator or a network designer. Each service group may contain multiple different types of communication traffic. Thereafter, for each service group, the number of users who utilize the services within that service group is determined. The average idle sojourn time and average burst sojourn time for each system state are then determined for each service group. Next, a specification of the peak rate, the probability that a user will access the service during a specified busy period, and an average session duration are determined. A specification of the price of each service per unit time is then provided by the network operator as well as the total available bandwidth in bits per second. Thereafter, these parameters are utilized to partition the bandwidth within the network among the various service groups so as to maximize long-run average system revenue.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
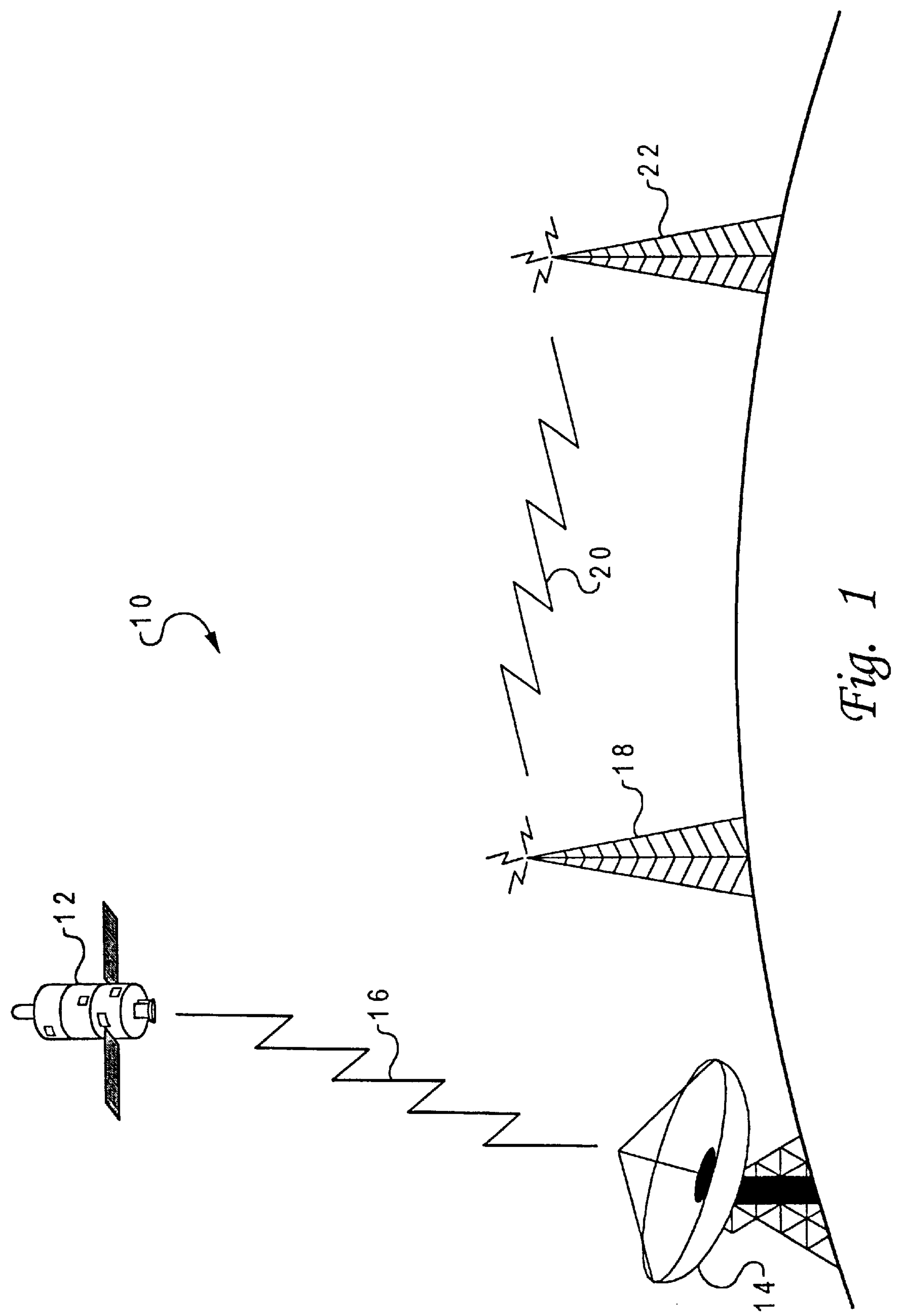
FIG. 1 is a schematic representation of a communication network which can incorporate multimedia traffic within a shared transmission medium.

With reference now to the figures and in particular with reference to FIG. 1, there is depicted a schematic representation of a communication network which incorporates multimedia traffic within a shared transmission medium. As illustrated, communication network 10 may include multiple transmission sources and receivers coupled together utilizing various transmission medium. For example, one type of network which may advantageously utilize the method and system of the present invention, is an ATM network which is utilized in conjunction with satellite communication. Thus, satellite 12 may communicate with earth station 14 over transmission medium 16. Similarly transmission tower 18 may communicate with transmission tower 22 over transmission medium 20. Of course, those skilled in the art will appreciate that transmission medium 16 will comprise a high frequency wide bandwidth radio frequency transmission medium; however, the method and system of the present invention will find application in any system in which aggregate multimedia traffic will occupy a shared transmission medium, such as, for example, a fiber optic transmission medium.

Figure 2:
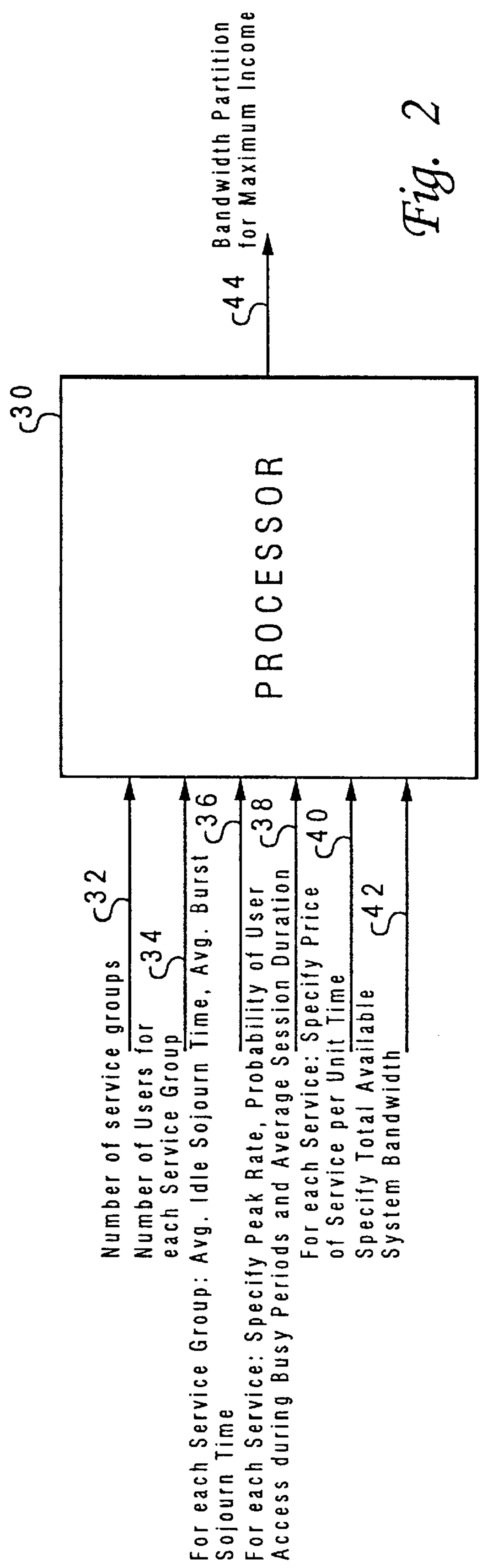
FIG. 2 is a high level block diagram of a system for calculating bandwidth allocation for multimedia traffic under aggregate traffic conditions within a shared transmission medium.

Referring now to FIG. 2 there is depicted a high level block diagram of a system for calculating bandwidth allocation for multimedia traffic under aggregate traffic conditions within a shared transmission medium in accordance with the present invention. As illustrated, the system depicted in FIG. 2 utilizing, as its central element, processor 30. Processor 30 may comprise an appropriately programmed computer such as a personal computer, workstation or other suitable computer possessing sufficient processor assets and processing capability to create the model which will described herein.

Those skilled in the art will appreciate that in order to maximize long-run average system revenue within a network, the allocation of bandwidth within the network must occur in a manner which accurately reflects the desired investment return on the system and the actual utilization parameters for each service within the network. It must then be necessary to accurately describe the various types of aggregate traffic which originate from heterogeneous sources, which may include widely diverse characteristics. It is therefore imperative that the parameters utilized within this assessment be accurate so that the calculation of bandwidth allocation within the network can result in an efficient utilization of the network.

As depicted, processor 30 utilizes six different inputs to generate the desired bandwidth partitioning for maximum long-run average system revenue. Input 32, as depicted within FIG. 2, comprises the total number of different service groups within the network. This number is typically provided by the network operator and/or network designer and, of course, may include different types of telecommunication traffic within each service group. As will be set forth in greater detail herein, services are typically grouped together based upon revenue parameters such as the price per unit time for each service within a particular service group. The services provided within each service group may include voice, data, teleconferencing, video on demand and other similar communication types.

Next, as specified at input 34, the maximum number of users who may utilize the services within a service group is determined. This number may be generated by measurements, research literature or standards bodies such as the International Telecommunication Union-Telecommunication (ITU-T). Alternatively, one technique for determining the total service capacity for multimedia services under aggregate traffic conditions is set forth within one of the above-referenced patent applications.

Next, for each service group, the average idle sojourn time and average burst sojourn time are determined for each system state as specified at input 36. Again, these values may be obtained from measurements of existing networks, research literature or standards bodies such as the ITU-T. Alternately, one excellent technique for determining the average idle sojourn time and average burst sojourn time may be found within one of the copending patent applications referenced above.

Next, input 38 comprises a specification of the peak rate for each service, a determination of the probability that a user will access a particular service group during a busy period and the average session duration for each such access. These values may also be obtained from measurement, research literature or standards bodies.

Input 40 comprises a specification of the price of service per unit time. This number is typically provided by the network operator and/or network designer and is calculated based upon various market and technological factors.

Finally, the total available system bandwidth in bits per second is specified by the network operator or designer and serves as input 42 to system 30.

Each of these inputs is then combined within processor 30, in a manner which will be explained in greater detail herein, to result in a single output 44 which comprises a partitioning of the bandwidth available within the network among the various service groups so as to maximize long-run average system revenue.

Figure 3:
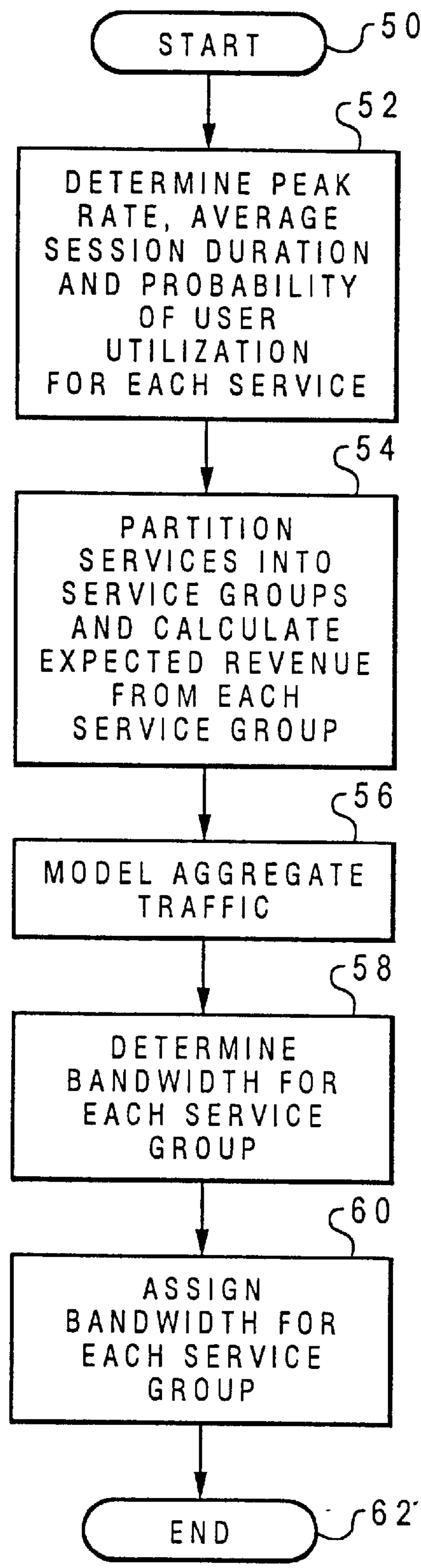
FIG. 3 is a high level logic flowchart of the method for calculating bandwidth allocation for multimedia traffic under aggregate traffic conditions within a shared transmission medium in a manner which maximizes long-run average system revenue.

Finally, with reference to FIG. 3, there is depicted a high level flowchart of the method of bandwidth allocation for multimedia services under aggregate traffic conditions in accordance with the present invention. As illustrated, the process begins at block 50 and thereafter passes to block 52. Block 52 depicts the determination of the peak rate, average session duration and probability of user utilization for each service. These values are expressed as a peak bandwidth requirement $R_i$ for each service i, an average session duration $S_i$ for each service i and a probability $E_i$ that a user will utilize service i and these values may be obtained from network measurements, research literature or standards bodies such as the ITU-T.

Next, as depicted in block 54, the services are partitioned into service groups and the expected revenue from each service group is calculated. Thus, if K is the number of service groups, the value of K and the number and type of services within each service group can be selected based upon network operator system objectives. For example, services may be partitioned into three service groups, namely: Premium, a service group which contains those services having high service price per unit time; Extended, a service group which contains services having moderate service price per unit time; and, Basic, a service group which contains those services having inexpensive cost per unit time. Thus, in the present example, the number of service groups K will be three.

Thereafter, for each service i, let price(i) be the price of service i per unit time. For each service group k, let $n_k$ be the number of users who utilize the service in service group k. Thereafter, the expected revenue $r_k(n_k)$ for service group k may be defined as follows:

$$r_k(n_k) = \sum_{i \in k} n_k * E_i * S_i * \text{price}(i)$$

Next, the process passes to block 56. Block 56 illustrates the modeling of the aggregate traffic from the various traffic sources as a stochastic system. One excellent technique for modeling the aggregate traffic from heterogenous sources is set forth in the first copending patent application referenced above. Thereafter, a system state is defined for a service group as a tuple $(n_1, n_2, \ldots n_3)$ which specifies that there are $n_i$ calls in progress, $n_2$ calls in progress, . . . $n_k$ calls in progress within the service group. For each service group k, the average idle sojourn time $(1\ \lambda_k(m))$ an average burst sojourn time $(1/\mu_k(m))$ for each system state can be determined, where m is the number of users of services in service group k. Thereafter, an activity ratio $\rho_k(m)$ is defined as follows: $\rho_k(m)=\lambda_k(m)\mu_k(m)$ While described herein as a serial process, those skilled in the art will appreciate that the partitioning of services into service groups and the modeling of the aggregate traffic can be accomplished contemporaneously, rather than serially as depicted herein.

Next, the process passes to block 58. Block 58 illustrates the determination of the bandwidth to be assigned to each service group. Thus, for each service group k, let $\beta_k$ be the bandwidth we wish to compute for service group k. Thereafter, let the peak bandwidth requirement $G_k$ for each service group k be the maximum bandwidth requirement $R_i$ for services i within service group k. Thereafter, we can define the long-run average revenue rate $W_k(B_k)$ associated with service group k as follows:

$$W_k(\beta_k) = \frac{\sum_{n=0}^{\lfloor \beta_k / G_k \rfloor} r_k(n) * \sigma_k(n)}{\sum_{n=0}^{\lfloor \beta_k / G_k \rfloor} \sigma_k(n)}, \text{ where } \sigma_k(n) = \prod_{m=0}^{n-1} \rho_k(m)$$

Next, if C is the peak network bandwidth, in order to find the value of $B_k$ for each service group k, dynamic programming may be utilized to solve the following allocation problem:

$$\text{maximize} \quad \sum_{k=1}^{K} W_k(\beta_k)$$

$$\text{subject to} \quad \sum_{k=1}^{K} \beta_k = C,\ 0 \le \beta_k \le C,\ \beta_k \text{ is an integer, and}$$

$$k = 1, \ldots, K.$$

Finally, referring to block 60, the bandwidths for each service group are assigned based upon the calculations above. Thus, services which belong to the same service group will share a particular bandwidth allocation on a first-come first-served basis. Services which belong to different service groups will not share bandwidth. Therefore, the present system provides a variation of the complete sharing approach and complete partitioning approach wherein services are partitioned into service groups and each service within a particular service group enjoys a complete sharing approach for the bandwidth allocated to that service group. The process then passes to to block 62 and terminates.

Upon reference to the foregoing, those skilled in the art will appreciate that by utilizing the modeling techniques set forth herein, the bandwidth allocation for multimedia services under aggregate traffic conditions may be calculated in a manner which maximizes long-run average revenue by combining a complete sharing bandwidth allocation approach with a complete partitioning bandwidth allocation approach in a manner which accurately and efficiently reflects the characteristics of the types of service within the network. The method and system of the present invention utilizes characterization of these services to accurately and efficiently allocate bandwidth within the network in a manner which will maximize long-run average system revenue.

While the invention has been particularly shown and described with reference to a preferred embodiment, it will be understood by those skilled in the art that various changes in form and detail may be made therein without departing from the spirit and scope of the invention.

What is claimed:

1. A method for efficient bandwidth allocation for a plurality of heterogenous telecommunication services under aggregate traffic conditions within a network having a shared transmission medium, said method for comprising the steps of:

partitioning said plurality of heterogenous telecommunication services into a plurality of service groups;

creating a multi-state model of said plurality of heterogenous telecommunication services under aggregate traffic conditions;

utilizing said multi-state model of said pluralitv of heterogenous telecommunication services under aggregate traffic conditions to determine an average idle sojourn time and average burst sojourn time for each state within said model;

assigning a selected portion of bandwidth within said shared transmission medium to an associated one of said plurality of service groups utilizing said multi-state model; and allocating bandwidth within said assigned selected portion to telecommunication services within an associated service group on a first-come, first-served basis.

2. The method for efficient bandwidth allocation for a plurality of heterogenous telecommunication services according to claim 1 wherein said step of partitioning said plurality of heterogenous telecommunication groups into a plurality of service groups further comprises the step of assigning each telecommunication service to a particular service gropu based upon a price per unit time for each telecommunication service.

3. The method for efficient bandwidth allocation for a plurality of heterogenous telecommunication services according to claim 1 wherein said step of assigning a selected portion of bandwidth within said shared transmission medium to an associated one of said plurality of service groups comprises the step of assigning a selected portion of bandwidth within said shared transmission medium based upon said price per unit time for each telecommunication service within a selected service group in order to maximize long-run average network revenue.

4. A system for efficient bandwidth allocation for a plurality of heterogenous telecommunication services under aggregate traffic conditions within a network having a shared transmission medium, said system comprising:

means for partitioning said plurality of heterogenous telecommunication services into a plurality of service groups;

means for creating a multi-state model of said plurality of heterogenous telecommunication services under aggregate traffic conditions, means for utilizing said multi-state model of said plurality of heterogenous telecommunication services under aggregate traffic conditions to determine an average idle sojourn time and average burst sojourn time for each state within said model;

means for assigning a selected portion of bandwidth within said shared transmission medium to an associated one of said plurality of service groups utilizing said multi-state model; and means for allocating bandwidth within said assigned selected portion to telecommunication services within an associated service group on a first-come, first-served basis.

5. The system for efficient bandwidth allocation for a plurality of heterogenous telecommunication services according to claim 4 wherein said means for partitioning said plurality of heterogenous telecommunication groups into a plurality of service groups further comprises means for assigning each telecommunication service to a particular service group based upon a price per unit time for each telecommunication service.

6. The system for efficient bandwidth allocation for a plurality of heterogenous telecommunication services according to claim 4 wherein said means for assigning a selected portion of bandwidth within said shared transmission medium to an associated one of said plurality of service groups comprises means for assigning a selected portion of bandwidth within said shared transmission medium based upon said price per unit time for each telecommunication service within a selected service group in order to maximize long-run average network revenue.

* * * * *

UNITED STATES PATENT AND TRADEMARK OFFICE

CERTIFICATE OF CORRECTION

PATENT NO. : 5,914,945
DATED : June 22, 1999
INVENTOR(S) : Abu-Amara et al.

It is certified that error appears in the above-identified patent and that said Letters Patent is hereby corrected as shown below:

Column 1, Line 11 delete "0267-AD-RR1-1154" and replace with --0267AD-RR1154--; and Column 6, Line 63 delete "gropu" and replace with --group--.

Signed and Sealed this

Eighth Day of February, 2000

Attest:

Q. TODD DICKINSON

*Attesting Officer*

*Commissioner of Patents and Trademarks*